United States Patent [19]

Maruyama et al.

[11] 3,924,021

[45] Dec. 2, 1975

[54] METHOD OF ELECTRON BEAM CURING OF COATED UNSATURATED SUBSTRATES CONTAINING SILICON CARBIDE

[75] Inventors: Tsutomu Maruyama; Kazuo Yamashita, both of Hiratsuka, Japan

[73] Assignee: Kansai Paint Company, Ltd., Amagasaki, Japan

[22] Filed: Feb. 14, 1974

[21] Appl. No.: 442,602

Related U.S. Application Data

[63] Continuation of Ser. No. 331,702, Feb. 12, 1973, abandoned.

[30] Foreign Application Priority Data

Feb. 18, 1972 Japan.................................. 47-16409

[52] U.S. Cl. ......... 427/35; 204/159.13; 204/159.14; 204/159.15; 204/159.16; 204/159.19; 204/159.2; 204/159.24; 260/40 R; 260/42.21; 260/42.28; 260/94.7 R; 260/827; 260/836; 260/837 R; 260/857; 260/859; 260/861; 260/865; 427/384; 427/385; 427/386; 427/387; 428/418; 428/425; 428/431; 428/481

[51] Int. Cl.$^2$.......................C08F 8/00; C08G 18/00; C08G 63/00

[58] Field of Search....... 204/159.2, 159.24, 159.18, 204/159.15, 159.16, 159.14; 96/115 P; 117/93.31; 260/861, 836, 837 R

[56] References Cited

UNITED STATES PATENTS 3,231,483   1/1966   Cotton........................... 204/159.24

FOREIGN PATENTS OR APPLICATIONS 86,456   10/1970   Germany

*Primary Examiner*—Richard B. Turer
*Attorney, Agent, or Firm*—Wigman & Cohen

[57] ABSTRACT

In coating materials which are cured on exposure to electron beam, a coating composition curable by electron beam which is characterized in that the composition is prepared in containing from 5% by weight to 30% by weight of silicon carbide and/or corundum to coating film forming component of the coating composition.

6 Claims, No Drawings

METHOD OF ELECTRON BEAM CURING OF COATED UNSATURATED SUBSTRATES CONTAINING SILICON CARBIDE

This is a continuation of application Ser. No. 331,702 filed Feb. 12, 1973, now abandoned.

The present invention relates to a radiation-curable coating composition, more particularly to an electron beam-curable coating composition whereby the dose of electron beam can be decreased remarkably, and coated film properties also improved.

In recent years many efforts have been made to develop means for curing coated film by making use of electron beam. First of all, it has been required to reduce the production cost by raising the productivity in the coating line when such a curing method is commercialized in a coating line. This is because such an apparatus for electron beam irradiation is more expensive as compared with any other conventional radiation sources.

It is an object of the present invention to provide an electron beam-curable coating composition satisfying those requirements described above.

The coating composition according to the present invention is obtained by incorporating silicon carbide and/or corundum in conventional coating materials for curing by electron beam, whereby the dose of electron beam necessary for curing coated film is greatly lowered and the productivity in the coating line is also greatly improved in addition to the improvement of coated film properties thus obtained.

In other words, the present invention is intended to provide a novel, electron beam-curable coating composition which is prepared by combining 5–30% by weight of silicon carbide and/or corundum to the coated film forming components of the coating material curable on irradiating electron beam.

Coating materials for curing by electron beam available in the present invention may be any one of those known ones. For example, there are exemplified those coating materials of which main components are resins having alpha, beta-olefinically unsaturated bonds such as unsaturated polyesters, unsaturated acrylic copolymers, unsaturated polyurethane, unsaturated epoxy resin, polybutadiene, unsaturated silicon resin, unsaturated polyamide and unsaturated melamine resin etc.

The electron beam-curable coating composition according to the present invention is made by combining those coating materials as above with silicon carbide and/or corundum, and the combined product thus obtained is thoroughly mixed with an ordinary dispersing device for coating materials while stirring. The amount of silicon carbide and/or corundum in said coating composition is conveniently about 5–30% by weight, based on the amount of about 70–95% by weight of coating film forming components in the coating substances for curing by electron beam, and is preferably about 10–20% by weight. If it is less than about 5% by weight, it is impossible to attain the object of the present invention owing to its inferior curing properties of coated films. On the other hand, provided the combined quantity is more than about 30% by weight, the stability of coatings becomes lower because specific gravities of silicon carbide and corundum are as large as 3.17 and 4.0, respectively.

The coating composition thus prepared is applied to wood materials, metals, plastics, leathers, or paper materials and subsequently is cured by irradiating electron beam thereon. Electron accelerators useful in the present invention are of Cockroft type, Cockroft-Walton type, Van de Graff type, a resonance transformer type, an insulated core transformer type and a high frequency type, etc. Such electron beam as accelerated and emitted from the accelerator are desirable to have an electronic energy in the range of 150–750 KeV and if it is below 150 KeV, the film thickness penetrable by electron beam is too small, while provided it is above 750 KeV, a more expensive accelerator with the availability of energy results, because according to higher energy electron beam, it deeply passes through coated films having a usual film thickness.

The excellent effects attained according to the coating composition of the present invention are as follows:

1. The period of time necessary for curing of coated film is lowered owing to the marked reduction of the dose of electron beam required. As a result, the object for lowering of production cost is fully attained, since the productivity in the coating line can be greatly raised by using the coating composition of the instant invention, even if a costly electron accelerator is employed on a commercial scale.

2. Further, since the coating composition itself contains a very hard silicon carbide and/or corundum, the hardness and abrasion-resistance of coated film are greatly increased, in addition to the improvement of its water resistance. Corundum plays also an important role to raise the chemical resistance of the coated film.

3. Furthermore, since silicon carbide and corundum effect little coloring, the coating composition according to the present invention is also compatible with enamel paints or clear ones.

The reason why the coating composition according to the present invention is cured by a small dose of electron beam is not determinable. It is, however, probable that when electron beam is irradiated onto the silicon carbide and/or corundum ingredient, there may occur gaining or losing of electrons to form a new source of promoting the curing, and that as the result, the curing period of time of the coated film is remarkably shortened.

The coating composition according to the present invention is useful for coating of articles in the wider fields of such coil coatings, coating of plywoods and plastics etc. as are suitable for curing by the irradiation of electron beam.

Typical preparation procedures and examples will be described hereinbelow by way of a mere example, but it will be appreciated that the invention is susceptable to modification, variation and change without departing from the spirit and scope thereof.

PREPARATION EXAMPLE 1

440G of maleic anhydride, 740g of phthalic anhydride, 936g of neopentyl glycol and 135g of diethylene glycol were taken in a flask provided with a stirrer, thermometer and reflux condenser, and condensation reaction was carried out in nitrogen stream under heating and conventional esterifying conditions to obtain an unsaturated polyester with an acid value of 38. To 55 parts of the polyester were added 30 parts of styrene and 15 parts of methyl methacrylate to dissolve, and a coating material 1 was obtained. To 93 parts of the coating material 1 was subsequently added 7 parts of silicon carbide (JIS R 6002 No. 800, and so forth), and full dispersing and mixing were carried out to make a coating material 1'. In the same manner, to 94 parts of coating material 1 was added 6 parts of corundum (JIS R 6002 No. 800, and so forth) to obtain a coating material 1''.

PREPARATION EXAMPLE 2

By using the same flask as pin Preparation Example 1, 1,000g of toluene was taken therein, stirred and heated at 130°C in nitrogen stream. A mixed solution of 260g of glycidyl methacrylate, 10g of benzoyl peroxide and 0.2g of hydroquinone was dropped in 3 hours to complete the reaction. The reaction mixture was heated at 130°–133°C for 3 hours and then was cooled to 50°C. To the resin varnish thus obtained was added 146.5g of methacrylic acid, and the mixture was gradually heated to 138°C in about 1.5 hours. The temperature was maintained for one hour to eliminate xylene. Non-volatile matter remained in the acrylic resin thus obtained was 98%. To 35 parts of the acrylic resin above, were added 35 parts of methyl methacrylate, 25 parts of butyl acrylate and 5 parts of ethylene glycol diacrylate and the mixture was fully dissolved. To the mixed and well dissolved solution was further added 50 parts of titanium oxide of rutile-type structure, to disperse therein by a paint conditioner (of Red Devil, Co.'s make) and thus a white enamel was obtained. The enamel thus produced was designated as a coating material 2. After that a full dispersing and mixing of 82 parts of coating material 2 and 0.5 part of a pigment dispersant (Trade Name: Antiteler-P, of BYK-Mallinckrodt Co.'s make) was followed to obtain a coating material 2'. In the same manner, a coating material 2'' was prepared by incorporating 85 parts of coating material 2 with 15 parts of corundum and 0.3 part of the pigment dispersant.

PREPARATION EXAMPLE 3

252G of acrylic acid, 1g of di-tert-butylhydroxytoluene and 2.5g of triethylamine were taken in the same flask as in Preparation Example 1 to heat to 110°–115°C, and 710g of Epikote 828 (of Shell Chemical Co.'s make, and an epoxy resin having an epoxy equivalent of 184–194) was dropped therein gradually in 2 hours. After completion of dropping, esterification reaction was conducted at the same temperature until an acid value of 5 was reached. To 60 parts of the resin thus obtained were added, mixed and dissolved 30 parts of methyl methacrylate, 10 parts of 1,6-hexanedioldiacrylate. The product was designated as a coating material 3. After that, to 75 parts of coating material 3 were added, dispersed and mixed thoroughly 25 parts of silicon carbide and 0.5 parts of a pigment dispersant (Trade Name: Antiteler-P) to prepare a coating material 3'. In the same way as above, a coating material 3'' was produced from 73 parts of coating material 3, 27 parts of corundum and 0.4 part of the pigment dispersant.

PREPARATION EXAMPLE 4

In the same flask as in Preparation Example 1 were put 340g of succinic acid, 1,388g of tetrahydrophthalic anhydride and 1,004g of propylene glycol and condensation reaction under heating was performed in nitrogen stream at conventional reaction conditions for esterification to obtain a resin having an acid value of 5.8. To the resin obtained thus was added 9.4g of a styrene mixture in which 1.4g of hydroquinone was dissolved, and then 17.4 parts of tolylenediisocyanate (80% by weight of 2,4-tolylenediisocyanate, 20% by weight of 2,6-tolylenediisocyanate) was slowly dropped therein to complete the reaction. Subsequent to that, 13g of 2-hydroxyethylmethacrylate was dropped thereto and the reaction was continued for 20 hours at 30°–40°C to make a resin.

To 55 parts of the resin thus made were added and mixed 20 parts of methylmethacrylate and 5 parts of 2-hydroxyethylmethacrylate to produce a resin varnish. The varnish obtained here was named a coating material 4. A coating material 4' was obtained likewise by dispersing and mixing fully 85 parts of coating material 4 and 15 parts of silicon carbide. In the same manner, a coating material 4' was made by adding 20 parts of corundum and 0.2 part of pigment dispersant (Trade Name: Antiteler-P) to 80 parts of coating material (4).

PREPARATION EXAMPLE 5

In the same flask as in Preparation Example 1, 600g of xylene was taken and continued to heat under refluxing, and subsequently a solution mixture of 350g of methyl methacrylate, 450g of ethylacrylate, 200g of 2-hydroxyethylacrylate and 10g of benzoyl peroxide was dropped gradually in the xylene in taking 2 hours. After completion of dropping, the prevailing temperature was maintained for 3 hours, and then the resin varnish thus made was cooled to the room temperature. To the cooled resin varnish were added slowly 22.5g of tolylenediisocyanate (80% by weight of 2,4-tolylenediisocyanate and 20% of 2,6-tolylenediisocyanate) and the reaction was continued for 5 hours, followed by another 20 hours after a gradual dropping of 20g of 2-hydroxyethyl methacrylate.

To 40 parts of the resin varnish thus produced were added and mixed 30 parts of methyl methacrylate, 20 parts of butylacrylate, 5 parts of 2-ethylhexylacrylate, 5 parts of propyleneglycoldiacrylate, and then 8 parts of blue enamel paste (phthalocyanine blue paste) was combined therewith to form a blue coating material. The coating material was called a coating material 5. To 80 parts of coating material (5) were added 10 parts of silicon carbide, 10 parts of corundum and 0.3 part of a pigment dispersant (Trade Name: Troikyd, Troi Chemical Co.'s make), and dispersing and mixing were carried out sufficiently to obtain a coating material 5'.

EXAMPLE 1

Each one of coating material 1, 1' and 1'' prepared in Preparation Example 1 was applied on a plate glass in a film thickness of 20μ. The coated film was cured at a variety of doses of electron beam in nitrogen atmosphere under such irradiation conditions as an electron beam energy of 300KeV, an electron beam current of 25 mA. The coated film thus cured was removed from the glass plate and put in a receptable made of a stainless steel wire netting (300 mesh) to weight. After a subsequent extracting for 18 hours in Soxhlet extractor by using acetone as an extracting solvent, it was dried at 110°C for 3 hours and was weighed. Thus a gel fraction was calculated according to the following formula:

$$\text{Gel Fraction (\%)} = \frac{\text{Weight of Sample after Extraction}}{\text{Weight of Sample before Extraction}} \times 100$$

wherein the silicon carbide and corundum contained in samples are omitted as an insoluble matter prior to the calculation.

These results are summerized in Table I.

Table I

| Coating Material Dose of Electron Beam | (1) | (1)' | (1)'' | (2) | (2)' | (2)'' | (3) | (3)' | (3)'' | (4) | (4)' | (4)'' | (5) | (5)' |
|---|---|---|---|---|---|---|---|---|---|---|---|---|---|---|
| 4 Mrad | 36.5 | 49.1 | 48.1 | 48.3 | 68.1 | 69.3 | 50.3 | 72.1 | 74.1 | 34.1 | 53.0 | 55.1 | 39.3 | 46.8 |
| 6 Mrad | 59.1 | 75.0 | 77.8 | 63.2 | 86.3 | 87.2 | 71.2 | 89.8 | 90.2 | 48.3 | 73.7 | 77.3 | 57.2 | 72.6 |
| 8 Mrad | 82.3 | 90.3 | 91.5 | 81.3 | 94.0 | 94.2 | 88.0 | 94.0 | 96.3 | 78.4 | 90.2 | 91.5 | 70.2 | 86.8 |
| 10 Mrad | 89.2 | 96.2 | 97.3 | 90.0 | 100 | 99.8 | 94.8 | 98.0 | 98.9 | 89.2 | 97.2 | 98.1 | 81.3 | 90.3 |

From Table I it can clearly be seen that the dose of electron beam required for curing the coated film is greatly decreased by incorporating silicon carbide and/or corundum in the coating material.

EXAMPLE 2

Each one of coating materials 1, 1', 1'', 2, 2' and 2'' from Preparation Examples 1 and 2 was coated on a lauan plywood (12 mm thick) pre-treated with a filler in a film thickness of 40$\mu$ Each of the coated films was exposed to an irradiation of a dose of 8 Mrad of electron beam under the same conditions as Example 1. The test results of the coated films cured thus are tabulated as follows.

EXAMPLE 3

Coating materials 5 and 5' obtained in, Preparation Example 5 were respectively applied to an ABS resin sheet in a film thickness of 30$\mu$. A dose of 10 Mrad of electron beam was irradiated thereon under the same conditions as Example 1. The test results of the cured coated film were shown in Table III.

Table II

| Coating Material Test Subject | (1) | (1)' | (1)'' | (2) | (2)' | (2)'' |
|---|---|---|---|---|---|---|
| Pencil Hardness | 2H | 4H | 4H | 2H | 4H | 4H |
| Adhesion | 90/100 | 100/100 | 100/100 | 100/100 | 100/100 | 100/100 |
| Stain Resistance | trace of stain | none | none | trace of stain | none | none |
| Solvent Resistance | slight loss of gloss | none | none | slight loss of gloss | none | none |
| Abrasion Resistance (a) | 125 times | 673 times | 654 times | 151 times | 1,218 times | 1,243 times |

EXAMPLE 4

Each one of coating materials 3, 3' and 3'' prepared in Preparation Example 3 was coated on a steel plate treated with Bonderite No. 137 in 18$\mu$ thick. And the coated plate was subjected to an irradiation of a dose of 7 Mrad of electron beam in $CO_2$ atmosphere under the similar conditions to these of Example 1. The test results of the irradiated cured film were summerized in Table IV.

Table IV

| Coating Material Test Subject | (4) | (4)' | (4)'' |
|---|---|---|---|
| Pencil Hardness | 2H | 3H | 4H |
| Solvent Resistance | slight loss of gloss | none | none |
| Abrasion Resistance (b) | 43 mg | 4.5 mg | 4 mg |

Table III

| Coating Material Test Subject | (5) | (5)' |
|---|---|---|
| Pencil Hardness | 2H | 4H |
| Adehsion | 100/100 | 100/100 |
| Solvent Resistance | none | none |
| Abrasion Resistance (b) | 41.3 mg | 6.0 mg |

The test methods in the present invention were performed in accordance with the following: Pencil Hardness: JIS K5400, 6.14 70

Adhesion: A hundred of checkers are made at a space of 1 mm on the surface of a coated film so as to reach its substrate and a cellophane tape is put on it and pressed with a uniform strength. As soon as the tape was pressed, it is stripped quickly and the unstripped checkers are numbered.

Stain Resistance: A coated film surface to be tested is stained with a lip stick (Trade Name: Kiss Me Super No. 3) and is left at a standstill at ambient temperature for 20 hours. After that, the stained surface is wiped with a piece of absorbent cotton and the appearance of the surface is inspected with the naked eye.

Solvent Resistance: A coated film surface to be tested is rubbed hard with a piece of gauze saturated with xylene and the rubbing is repeated eight times in to-and-fro motion. Then the surface condition is inspected with the naked eye.

What is claimed is:

1. A method for curing a coated substrate comprising the steps:
   a. applying a curable coating composition to a substrate, said coating composition comprising from about 5 to about 30% by weight of silicon carbide which is effective in reducing the curing time and/or dosage requirements for curing said coating composition in admixture with an unsaturated polyester resin; and
   b. irradiating said coated substrate using an electron beam at a rate and for a time which is less than would be required if said silicon carbide additive were not added.

2. The method of claim 4 wherein said film forming component is an unsaturated polyester resin.

3. The method of claim 1 wherein said silicon carbide is present in an amount ranging from about 10 to about 20% by weight.

4. In a method for curing a coated substrate comprising the steps of applying a curable coating composition to a substrate, said coating composition comprising a radiation curable, film forming component having alpha, beta-olefinically unsaturated bonds, and irradiating said coated substrate using an electron beam, the improvement comprising employing from about 5 to about 30% by weight of silicon carbide in admixture with said film forming component which is effective in reducing the curing time and/or dosage requirements for curing said coating composition.

5. The method according to claim 4 wherein said film forming component is taken from the group consisting essentially of unsaturated polyester resin, unsaturated epoxy resin, polybutadiene, unsaturated silicon resin, unsaturated polyamide and unsaturated melamine resin.

6. The method according to claim 4 wherein said silicon carbide is present in an amount ranging from about 10 to about 20% by weight.

* * * * *

UNITED STATES PATENT AND TRADEMARK OFFICE
CERTIFICATE OF CORRECTION

PATENT NO. : 3,924,021

DATED : December 2, 1975

INVENTOR(S) : Maruyama, Tsutomu et al

Page 1 of 2

It is certified that error appears in the above-identified patent and that said Letters Patent are hereby corrected as shown below:

Column 2, line 57, change "440G" to --440g--;

Column 3, line 39, change "252G" to --252g--;

Column 6, line 54, change "JIS K5400, 6.14 70" to --JIS K5400, 6.14(70)--;

Column 7, line 5, insert the two (2) missing paragraphs as shown on the attached sheets;

Columns 7 & 8, correct the sequence of the claims.

Signed and Sealed this sixth Day of April 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,924,021  Dated December 2, 1975

Inventor(s) TSUTOMU MARUYAMA et al

It is certified that error appears in the above-identified patent and that said Letters Patent are hereby corrected as shown below:

Abrasion Resistance (a): Taber Abrasion Tester is used in accordance with ASTM D1175-55K. The test is performed at a load of 1 Kg, using abrasive ring S-32 and abrasive paper S-33, and the number of times of abrasion required for reaching the substrate of coated film are counted up.

Abrasion Resistance (b): Taber Abrasion Tester is used. The abrasion loss per 1,000 revolutions is examined at a load of 500g, using abrasive ring CS-100.

Signed and Sealed this sixth Day of April 1976

[SEAL]

Attest:

RUTH C. MASON  
Attesting Officer

C. MARSHALL DANN  
Commissioner of Patents and Trademarks